US011584025B2

(12) United States Patent
Filipiak et al.

(10) Patent No.: US 11,584,025 B2
(45) Date of Patent: Feb. 21, 2023

(54) METHOD AND APPARATUS FOR AUTOMATED TRANSFORMING TOOLING SYSTEMS

(71) Applicant: Norgren Automation Solutions, LLC, Saline, MI (US)

(72) Inventors: Michael A. Filipiak, Ann Arbor, MI (US); Richard Hamann, Ann Arbor, MI (US); Daniel Kersey, Sterling Heights, MI (US); Vincent C. Rabaut, III, Grosse Pointe Woods, MI (US); Edwin E. Marttinen, Pinckney, MI (US)

(73) Assignee: Norgren Automation Solutions, LLC, Saline, MI (US)

( * ) Notice: Subject to any disclaimer, the term of this patent is extended or adjusted under 35 U.S.C. 154(b) by 608 days.

(21) Appl. No.: 16/747,253

(22) Filed: Jan. 20, 2020

(65) Prior Publication Data

US 2020/0230824 A1    Jul. 23, 2020

Related U.S. Application Data

(60) Provisional application No. 62/793,977, filed on Jan. 18, 2019.

(51) Int. Cl.
*G06F 17/00* (2019.01)
*B25J 15/04* (2006.01)
(Continued)

(52) U.S. Cl.
CPC ........ *B25J 15/0491* (2013.01); *B21D 43/105* (2013.01); *B25J 9/0084* (2013.01); *B25J 15/04* (2013.01)

(58) Field of Classification Search
CPC ...... B25J 15/0491; B25J 9/0084; B25J 15/04; B25J 15/0061; B25J 19/0004; B21D 43/105; B21D 43/057
(Continued)

(56) References Cited

U.S. PATENT DOCUMENTS 5,248,288 A    9/1993   Kamiya et al.
5,452,981 A    9/1995   Crorey et al.
(Continued)

FOREIGN PATENT DOCUMENTS

DE    3933888 A1    7/1990
EP    2111936 A2    10/2009
(Continued)

OTHER PUBLICATIONS

International Search Report and Written Opinion, PCT/US2020/014280, dated May 26, 2020.
(Continued)

*Primary Examiner* — Ronnie M Mancho
(74) *Attorney, Agent, or Firm* — McDonnell Boehnen Hulbert & Berghoff LLP

(57) ABSTRACT

An automated transforming tooling system apparatus and method for shuttling a workpiece to and from an industrial operation. The system includes a workstation for complementarily engaging and securing the workpiece, and at least one holder removably secures at least on end effector tool to the workstation. At least one transfer bar is movably positioned with respect to the workstation. At least one automated transforming tooling assembly is connected to the transfer bar and has a plurality of links adjustably connected by motorized joints to automatically position the automated transforming tooling assembly. An automated tool changer is connected to the automated transforming tooling assembly and releasably engages the end effector tool between a
(Continued)

disengaged position, wherein the end effector tool is disengaged from the automated tool changer, and an engaged position, wherein the end effector tool is engaged by the automated tool changer.

18 Claims, 10 Drawing Sheets

(51) Int. Cl.
  *B25J 9/00* (2006.01)
  *B21D 43/10* (2006.01)
(58) Field of Classification Search
  USPC .................................................. 414/225.01
  See application file for complete search history.

(56) References Cited

U.S. PATENT DOCUMENTS

| | | | |
|---|---|---|---|
| 5,584,205 A | 12/1996 | Harsch et al. | |
| 5,771,561 A | 6/1998 | Hofele | |
| 5,868,655 A | 2/1999 | Hofele | |
| 5,992,208 A | 11/1999 | Hofele et al. | |
| 6,126,582 A | 10/2000 | Dangelmayr et al. | |
| 6,416,273 B1* | 7/2002 | Herbermann | B25J 15/0061 414/751.1 |
| 6,712,198 B2 | 3/2004 | Harsch et al. | |
| 7,448,489 B2 | 11/2008 | Reichenbach | |
| 8,162,557 B2* | 4/2012 | Van Zile, III | B25J 15/0061 403/396 |
| 9,395,032 B2* | 7/2016 | Kotula | F16M 11/10 |
| 9,429,187 B2* | 8/2016 | Kotula | F16M 11/10 |
| 9,522,421 B2* | 12/2016 | Chappus | B21D 43/052 |
| 10,035,231 B2* | 7/2018 | Chappus | B25J 15/0061 |
| 10,124,486 B2* | 11/2018 | Marttinen | B25J 9/126 |
| 11,059,168 B2* | 7/2021 | Marttinen | B25J 15/0061 |
| 2008/0145195 A1 | 6/2008 | Sacerdoti et al. | |
| 2015/0285298 A1* | 10/2015 | Kotula | B23Q 1/26 403/84 |
| 2016/0089780 A1* | 3/2016 | Marttinen | F16D 7/027 901/23 |
| 2016/0151870 A1* | 6/2016 | Chappus | B25J 15/0061 269/56 |
| 2016/0318193 A1* | 11/2016 | Kotula | F16M 11/048 |
| 2019/0009406 A1* | 1/2019 | Marttinen | B25J 19/0004 |
| 2020/0230824 A1* | 7/2020 | Filipiak | B25J 15/0491 |

FOREIGN PATENT DOCUMENTS

| | | |
|---|---|---|
| EP | 3197644 A1 | 8/2017 |
| EP | 3 476 502 A1 | 5/2019 |

OTHER PUBLICATIONS

International Preliminary Report on Patentability and Written Opinion issued by The International Bureau of WIPO in International application No. PCT/US2020/014280 dated Jul. 29, 2021.

* cited by examiner

METHOD AND APPARATUS FOR AUTOMATED TRANSFORMING TOOLING SYSTEMS

CROSS-REFERENCE TO RELATED APPLICATIONS

The application claims the benefit of U.S. Provisional Patent Application Ser. No. 62/793,977 filed on Jan. 18, 2019, which is incorporated in its entirety by reference.

TECHNICAL FIELD

The present disclosure relates to automated transforming tooling systems, and more particularly, a method and apparatus for automated transforming tooling systems having automated tool changers that automatically adjust to different workpiece structures when shuttling workpieces to successive workstations.

BACKGROUND

In the manufacturing industry, such as the automotive industry, various manufacturing and assembly operations are performed on numerously configured workpieces. Such operation not only involve manufacturing and assembly operations being performed on the workpieces, but such operations also require handling and shuttling the workpieces between work stations. In one such example, sheet metal panels may be formed and shaped by stamping the sheet metal panels in stamping presses. The stamping presses typically include numerous, successive workstations that progressively stamp various shapes into the sheet metal panels until the workpiece reaches its final form. Each workstation of the stamping press provides a press die having a top and bottom press die. The bottom press die receives one or more workpieces in a complementary, supportive manner while the top press die is lowered onto the workpiece and the bottom press die with force to stamp a form or shape into the workpiece. The top press die may by lifted and lowered to engage the workpiece and the bottom press die numerous times until the final shape is formed into the workpiece. Once the desired shape of the workpiece is obtained for the particular stamping press workstation, the workpiece is moved to the next successive stamping press workstation where further forms and shapes are stamped into the workpiece.

Various automated handling and tooling designs have been developed to shuttle the workpieces between successive manufacturing and assembly workstations. For instance, in stamping presses, one or more transfer press bars or rails may be located adjacent to or overhead of the stamping press dies to move the workpieces between stamping press workstations. Automated manipulators, such as robotic arms, may also be utilized to shuttle the workpieces between stamping press workstations. Both transfer press bars and automated manipulators have tooling assemblies attached thereto wherein the tooling assemblies are designed to engage and disengage the workpieces for moving the workpieces between stamping press workstations. The transfer press bars are typically designed to cycle back and forth in dedicated vertical and horizontal directions such that the transfer press bars can transfer the workpieces between adjacent stamping press workstations. Automated manipulators may utilize multiple degrees of programmable movement for moving the workpieces between stamping press workstations. Either way, once the tooling assemblies engage the workpiece, the transfer press bars or the automated manipulators raise the workpiece from the bottom press die and move the workpiece to an adjacent stamping press workstation where the workpiece is loaded into the bottom press die. Once the tooling assemblies release the workpiece into the bottom press die, the transfer press bars or the automated manipulator cycle back to the previous stamping press workstation where the cycle begins again with the next workpiece.

In order to accommodate the many types of manufacturing and assembly operations, the tooling assemblies can take on many different configurations. In continuing with the stamping press example, the tooling assemblies may be connected to the transfer press bar or the automated manipulator at one end of the tooling assembly while having an end effector tool, such as a vacuum cup or a gripper, connected to the opposite end of the tooling assembly. The tooling assemblies are preferably designed with flexibility and adjustability in mind so that the tooling assemblies can adjust the position of the end effector tools to properly engage the workpiece. Previous tooling assemblies have utilized various sections of tubing interconnected by various rigid mounts for fixturing a variety of workpieces, but such designs typically provide little or no adjustment in the tooling assembly. Other designs have utilized extrusions, slide mounts, ball mounts, and serrated teeth thereby allowing the sections of the tubing to be adjusted in various directions, including linearly and radially. However, such designs have a limited amount of flexibility and range in that such designs typically only provide one degree or axis of adjustment.

Although the tooling assemblies may be adjusted to have their end effector tooling properly engage the workpiece, adjusting numerous tooling assemblies for a particular workpiece is a timely and tedious process. Thus, most tooling assemblies and their associated end effector tooling are commonly left in a predetermined position, such that when the stamping press dies are exchanged to form different shaped workpieces, the tooling assemblies and their end effector tooling are also exchanged for different positioned tooling assemblies and end effector tooling as opposed to adjusting the position of the same tooling assemblies and end effector tooling. Different positioned tooling assemblies and end effector tooling are then typically created for each shaped workpiece. The tooling assemblies are removably connected to the transfer rails or the automated manipulators to provide for simple and quick replacement of the tooling assemblies and the end effector tooling. However, since a different set of tooling assemblies and end effector tooling must be maintained for each differently shaped workpiece, numerous tooling assemblies and end effector tooling must be purchased, stored, and maintained, thereby creating inefficiencies in an industrial environment.

It would be desirable to provide an automated transforming tooling system that adjusted for any configuration of workpiece without having to purchase, store, and maintain multiple sets of prepositioned tooling assemblies and end effector tooling.

SUMMARY

The present disclosure provides an automated transforming tooling system apparatus for shuttling a workpiece to and from an industrial operation having a workstation for complementarily engaging and securing the workpiece. The workstation has at least one holder for removably securing at least one end effector tool to the workstation. At least one transfer bar is positioned adjacent the workstation and movable with respect to the workstation, and at least one automated transforming tooling assembly is connected to the at least one transfer bar wherein the at least one automated transforming tooling assembly has a plurality of links adjustably connected by motorized joints to automatically position the automated transforming tooling assembly in a predetermined position. An automated tool changer is connected to a free end of each of the at least one automated transforming tooling assembly, and the automated tool changer releasably engages the at least one end effector tool between a disengaged position, wherein the at least one end effector tool is disengaged from the automated tool changer and secured in the at least one holder of the workstation, and an engaged position, wherein the at least one end effector tool is engaged by the automated tool changer such that the at least one automated transforming tooling assembly moves toward the workpiece to allow the at least one end effector tool to engage the workpiece and move the workpiece to and from the workstation through the movement of the transfer bar. A manipulator is connected to the transfer bar for moving the transfer bar between predetermined positions. A central processing unit communicates with the at least one transforming tooling assembly, and the central processing unit controls the operation of the motorized joints to determine the position of the links. The at least one transforming tooling assembly each has clutches to lock and unlock the motorized joints from moving prior to, during, and after the movement of the motorized joints. An automated tool changing device releasably connects each of the at least on one transforming tooling assembly to the end effector tool. The automated tool changing device has a quick-change tooling receiver connected to each of the at least one transforming tooling assembly and a quick-change tooling adapter connected to the end effector tooling wherein the quick-change tooling receiver and the quick-change tooling adapter may releasably engage one another to releasably connect the end effector tooling to the at least one transforming tooling assembly. The at least one holder on the workstation has an L-shaped bracket with an open-ended slot for removably receiving and holding the end effector tooling. A recess is formed within the workstation wherein at least a portion of the L-shaped bracket is disposed within the recess. The manipulator may comprise a programmable robotic arm.

The present disclosure also provides an automated transforming tooling system method for shuttling a workpiece to and from an industrial operation. The method includes complementarily engaging and securing the workpiece to a workstation; securing at least one end effector tool in a holder connected to the workstation; movably positioning at least one transfer bar with respect the workstation; connecting at least one automated transforming tooling assembly to the at least one transfer bar wherein the at least one automated transforming tooling assembly has a plurality of links adjustably connected by motorized joints to automatically position the automated transforming tooling assembly in a predetermined position; connecting an automated tool changer to a free end of each of the at least one automated transforming tooling assembly, and releasably engaging the automated tool changer to the at least one end effector tool between a disengaged position, wherein the at least one end effector tool is disengaged from the automated tool changer and secured in the at least one holder of the workstation, and an engaged position, wherein the at least one end effector tool is engaged by the automated tool changer such that the at least one automated transforming tooling assembly moves toward the workpiece to allow the at least one end effector tool to engage the workpiece and move the workpiece to and from the workstation through the movement of the transfer bar.

The method further provides connecting a manipulator to the transfer bar for moving the transfer bar between predetermined positions; communicating signals from a central processing unit to the at least one transforming tooling assembly for controlling the operation of the motorized joints and determining the position of the links; providing the at least one transforming tooling assembly with clutches to lock and unlock the motorized joints from moving prior to, during, and after the movement of the motorized joints; releasably connecting an automated tool changing device to each of the at least on one transforming tooling assembly and to the end effector tool; the automated tool changing device having a quick-change tooling receiver connected to each of the at least one transforming tooling assembly and a quick-change tooling adapter connected to the end effector tooling wherein the quick-change tooling receiver and the quick-change tooling adapter may releasably engage one another to releasably connect the end effector tooling to the at least one transforming tooling assembly; providing the at least one holder on the workstation with an L-shaped bracket having an open-ended slot for removably receiving and holding the end effector tooling; forming a recess within the workstation wherein at least a portion of the L-shaped bracket is disposed within the recess; and providing a programmable robotic arm as the manipulator.

BRIEF DESCRIPTION OF THE DRAWINGS

The present disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
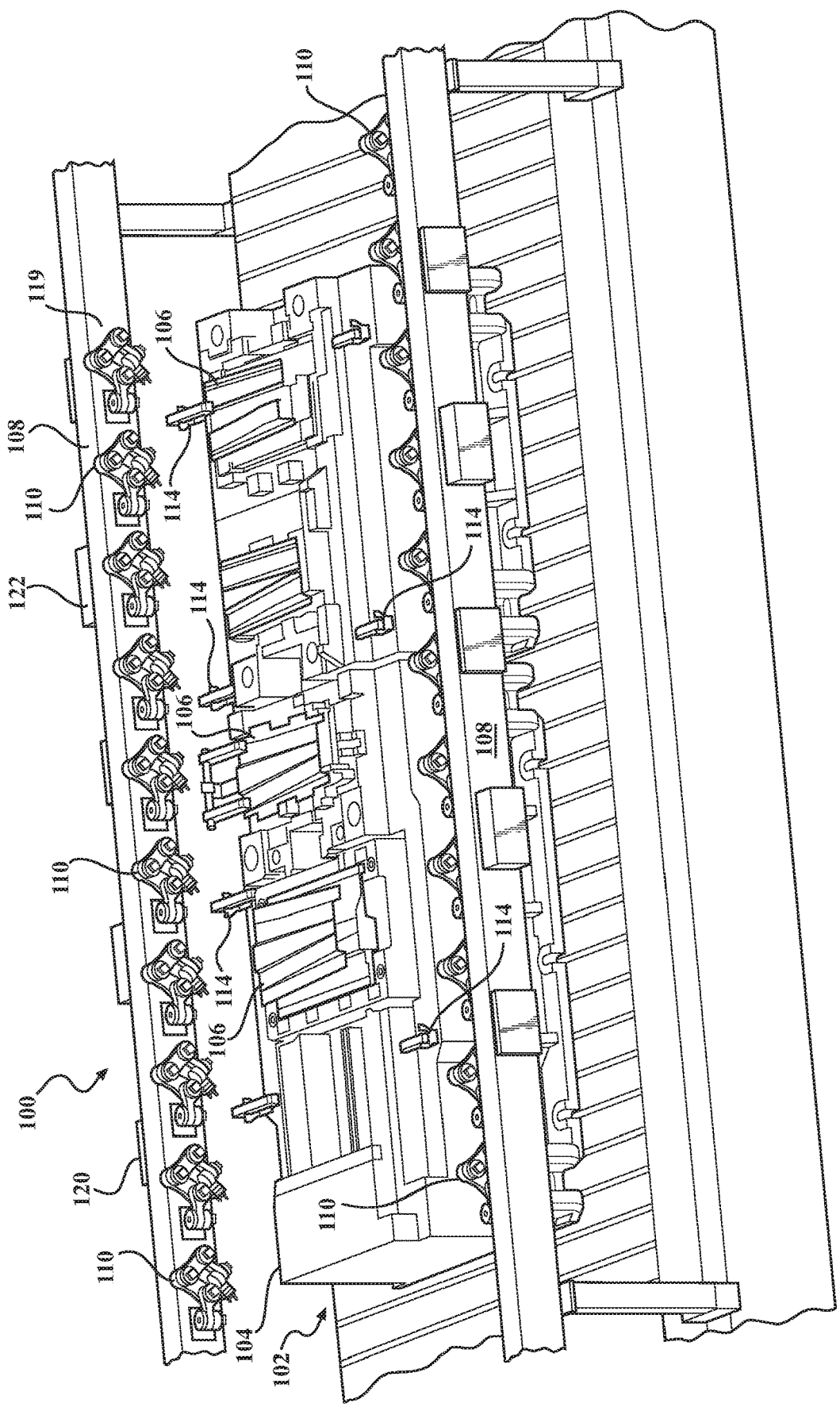
FIG. 1 is a perspective view of an automated transforming tooling system having side transfer press rails with transforming tooling assemblies disengaged from the end effector tools and workpieces.
Figure 2:
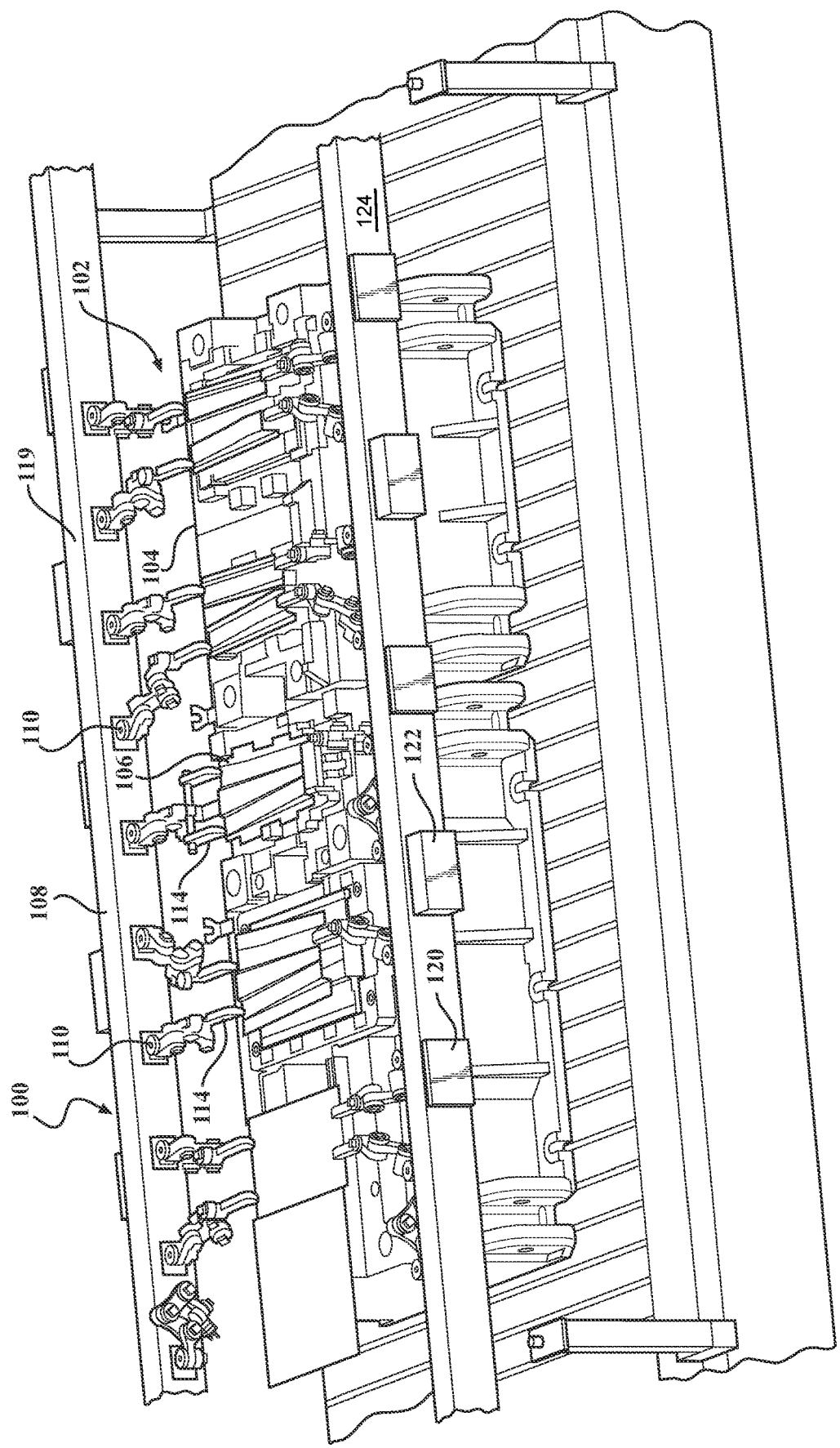
FIG. 2 is a perspective view of the automated transforming tooling system having side transfer press rails with the transforming tooling assemblies engaged with the end effector tools and workpieces.
Figure 3:
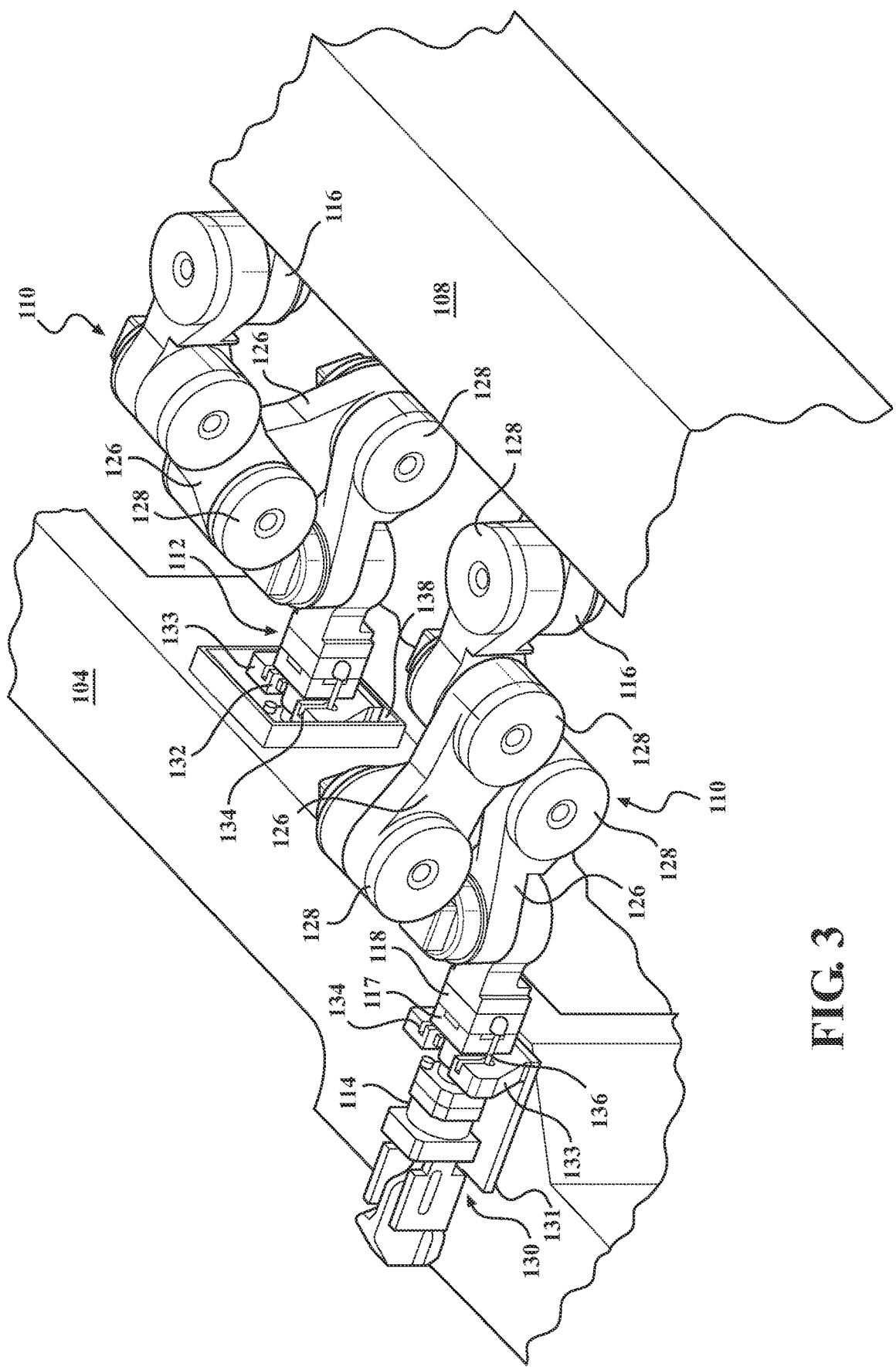
FIG. 3 is a side perspective view of the transforming tooling assemblies and the end effector tools of the automated transforming tooling system.
Figure 4:
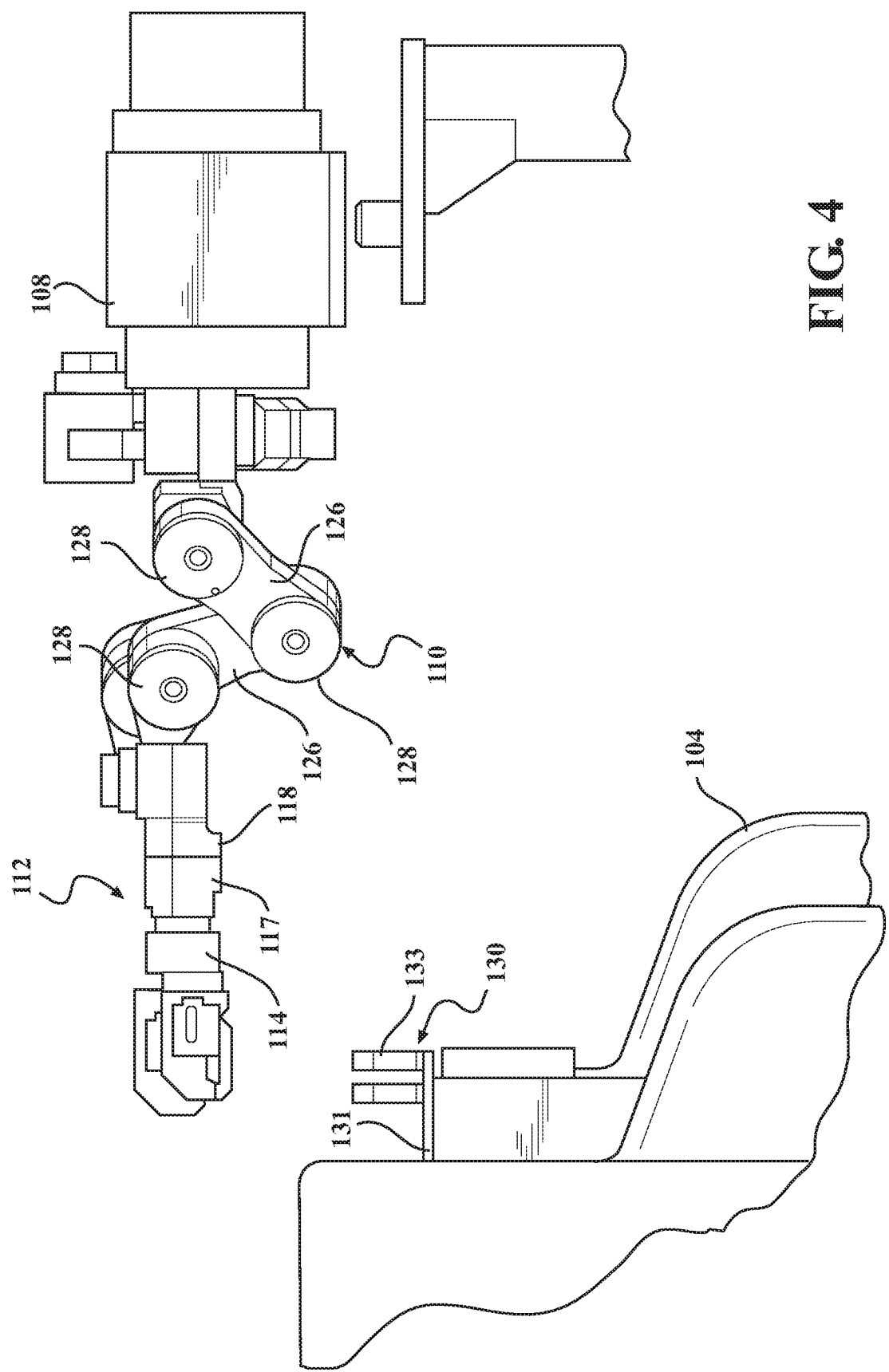
FIG. 4 is a side plan view of the automated tool changing device of the automated transforming tooling system.
Figure 5:
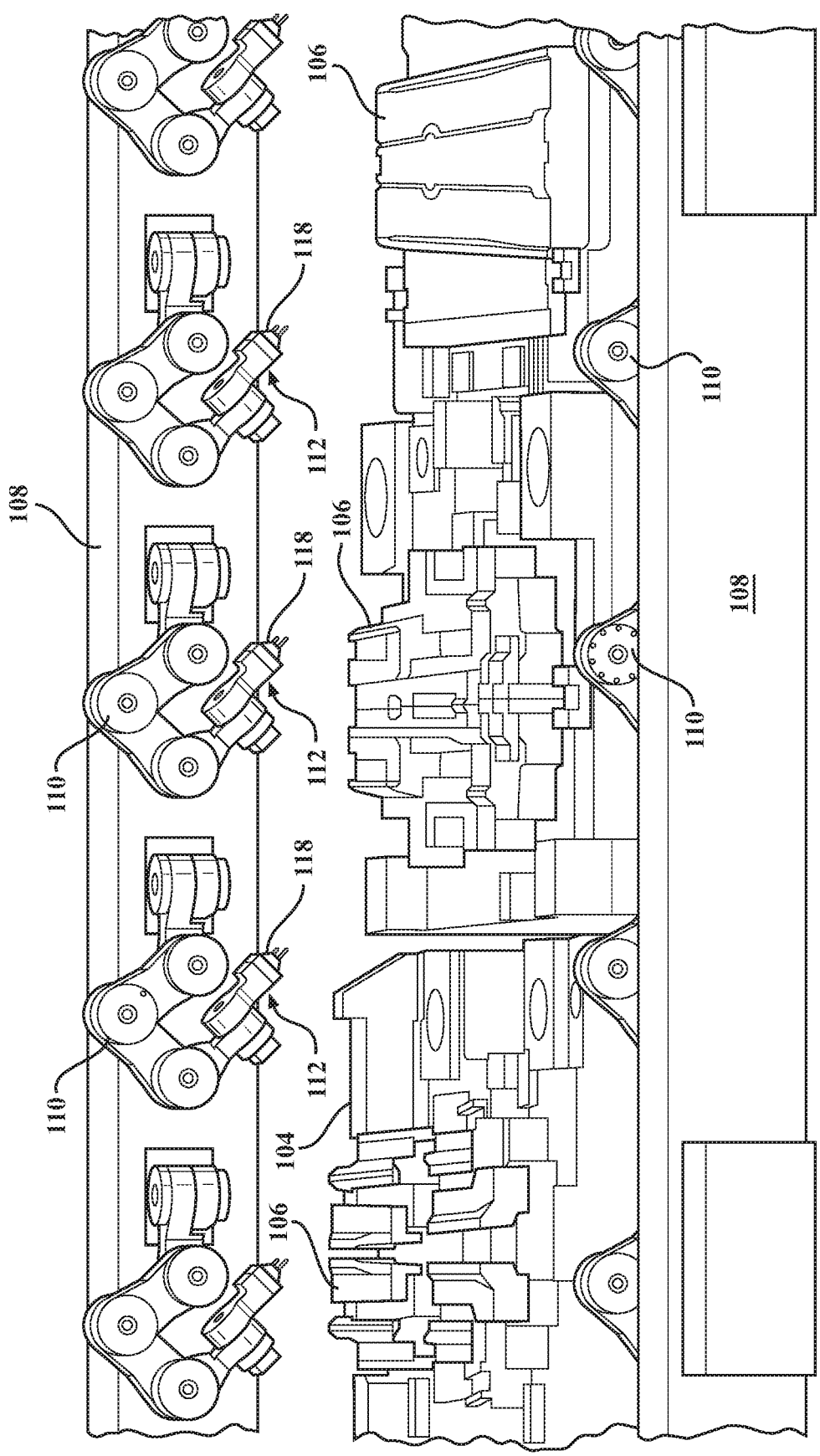
FIG. 5 is a perspective view of the automated transforming tooling system shown in FIG. 1.

The present disclosure provides an automated transforming tooling system method and apparatus to accommodate the manufacturing, assembling, and handling of variously configured workpieces for various types of industrial operations. Although the present disclosure references an automated transfer press assembly, the present disclosure is not limited to an automated transfer press assembly, but rather, the present disclosure may be utilized in conjunction with any manufacturing, assembling, or handling operation that benefits from the use of an automated transforming tooling system as provided in the present disclosure.

With reference to FIGS. 1-10, the present disclosure provides a method and apparatus for an automated transforming tooling system 100 having an automatic tool changing device 112. The automated transforming tooling system 100 may be utilized within an industrial stamping press (not shown), although the automated transforming tooling system 100 may be utilized in conjunction with any type of industrial operation. In the industrial stamping press, a workpiece 106 is stamped into progressive shapes and forms within at least one stamping press workstation 102 of the stamping press. The automated transforming tooling system 100 may be utilized in conjunction with at least one transfer press rail or bar 108 wherein at least one automated transforming tooling assembly 110 is connected to the transfer press rail 108. The automated transforming tooling assembly 110 may be removably connected to end effector tooling 114 using the automatic tool changing device 112. The end effector tooling 114 removably engages the workpiece 106 for transferring the workpiece 106 between the stamping press workstations 102 of the stamping press upon the transfer press rail 108 cyclically moving between adjacent stamping press workstations 102. Although the present disclosure describes the automated transforming tooling system 100 and automated tooling changing device 112 being utilized in an industrial stamping press, it should be noted that the present disclosure is not limited to industrial stamping presses or transfer presses, but rather, the automated transforming tooling system 100 could be utilized in any industrial environment or application where the present disclosure would be advantageous, such as industrial applications that require various positioning of the end effector tooling 114 for handling and transporting various shaped workpieces 106.

The method and apparatus of the automated transforming tooling system 100 of the present disclosure may be utilized in conjunction with the stamping press, wherein the stamping press has consecutive and progressive stamping press workstations 102. Each stamping press workstation 102 provides a stamping press die having a bottom press die 104 and a top press die (not shown). The bottom press die 104 has a configuration that complementarily receives the workpiece 106. The workpiece 106 may be fabricated from sheet metal panels or other similar materials wherein the sheet metal panels can be configured and formed into a predetermined shape through the stamping process. However, it should be noted that the workpiece 106 could be fabricated in different configurations and from different materials should the automated transforming tooling system 100 be utilized in conjunction with other industrial operations besides stamping. When the workpiece 106 is positioned in the bottom press die 104, the top press die moves toward and presses against the workpiece 106 and the bottom press die 104 with force which is commonly referred to as "stamping". The top press die has a shape formed therein that complementarily engages the bottom press die 104 to stamp the desired shape into the workpiece 106. The pressing of the top press die onto the workpiece 106 and the bottom press die 104 may occur once or numerous times until the desired shape of the workpiece 106 is obtained. Once the desired shape of the workpiece 106 is obtained for the particular stamping press workstation 102, the workpiece 106 is then transferred to an adjacent stamping press workstation 102 wherein the workpiece 106 is again stamped in a similar manner as previously described. This process continues through consecutive and progressive stamping press workstations 102 until the final form of the workpiece 106 is obtained.

Figure 6:
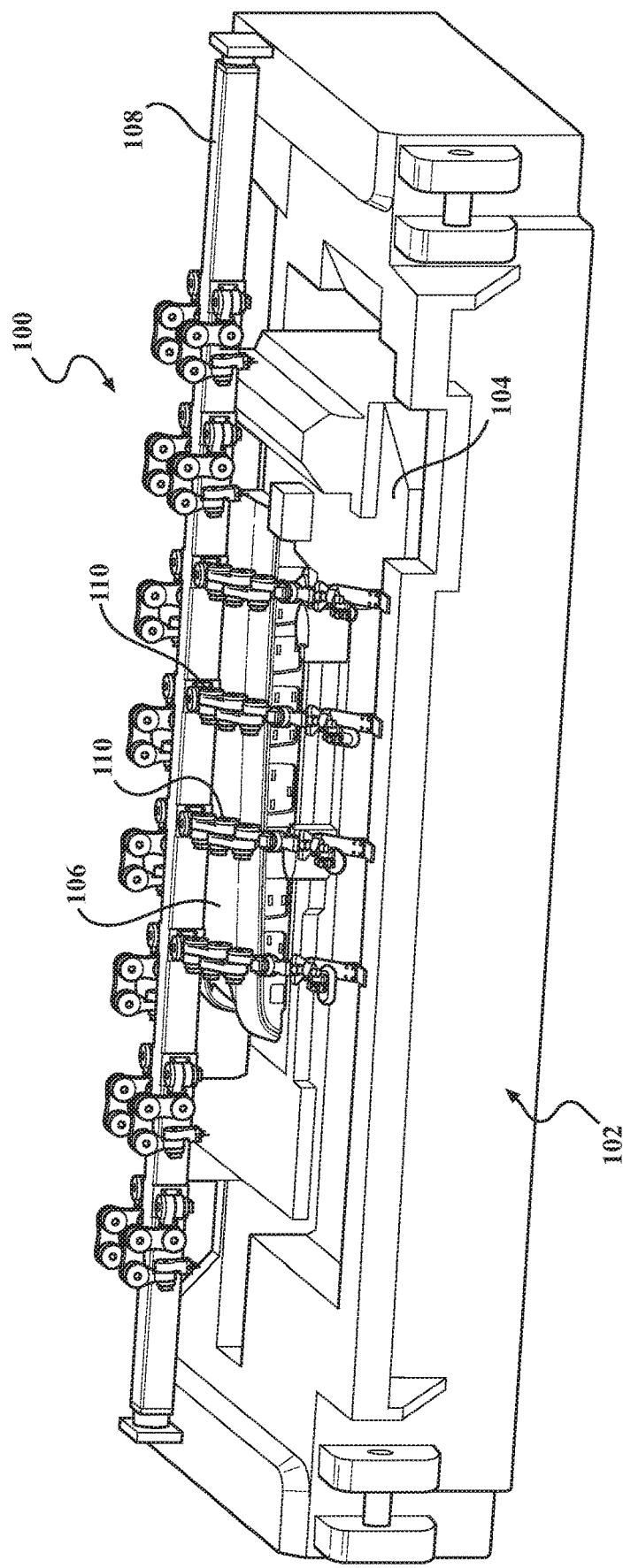
FIG. 6 is a perspective view of an automated transforming tooling system utilizing an overhead transfer press rail.
Figure 7:
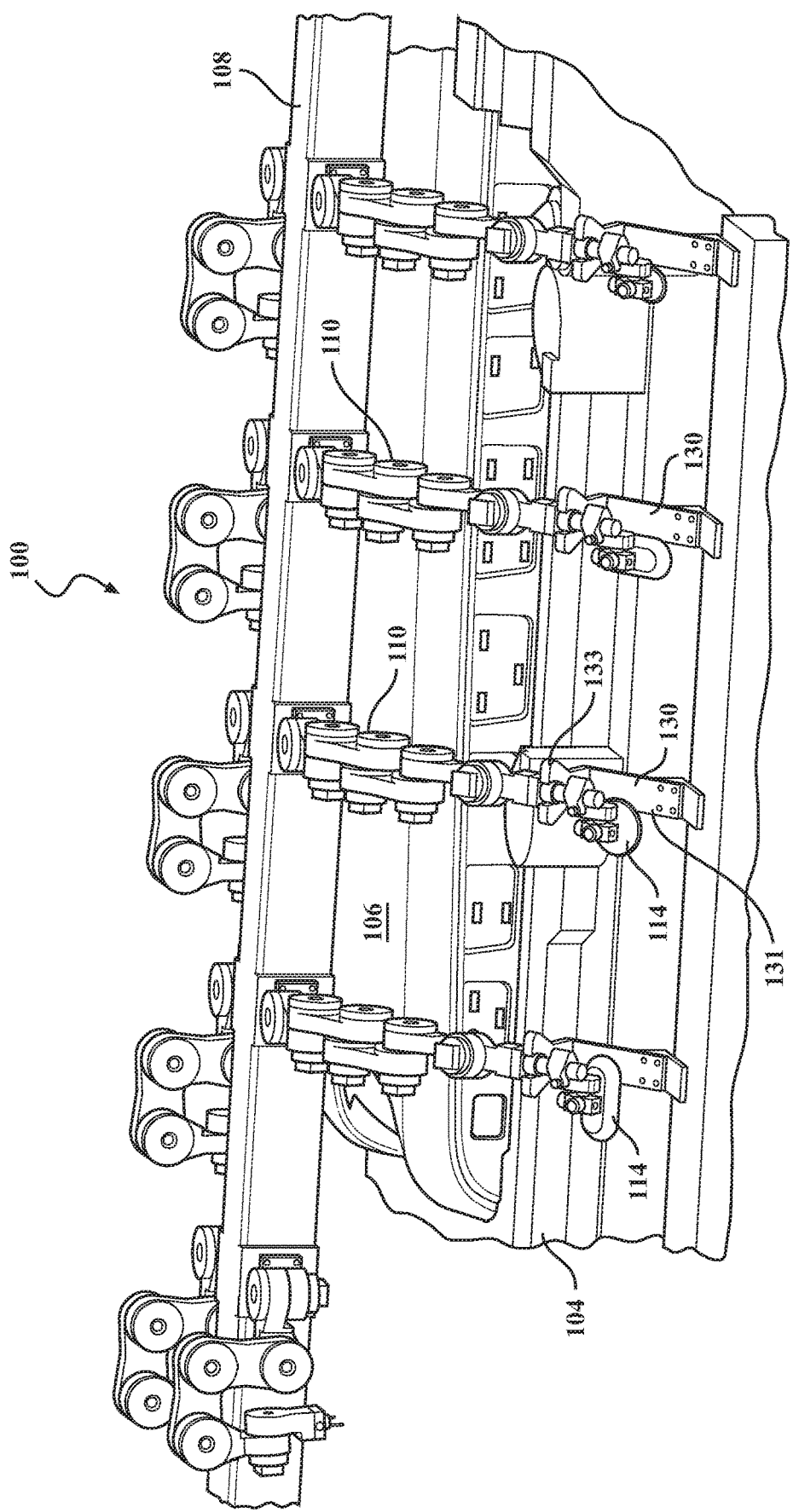
FIG. 7 is a perspective view of an automated transforming tooling system of FIG. 6 utilizing an overhead transfer press rail with the transforming tooling assemblies engaging the end effector tools in the L-shaped brackets on the bottom press die.
Figure 8:
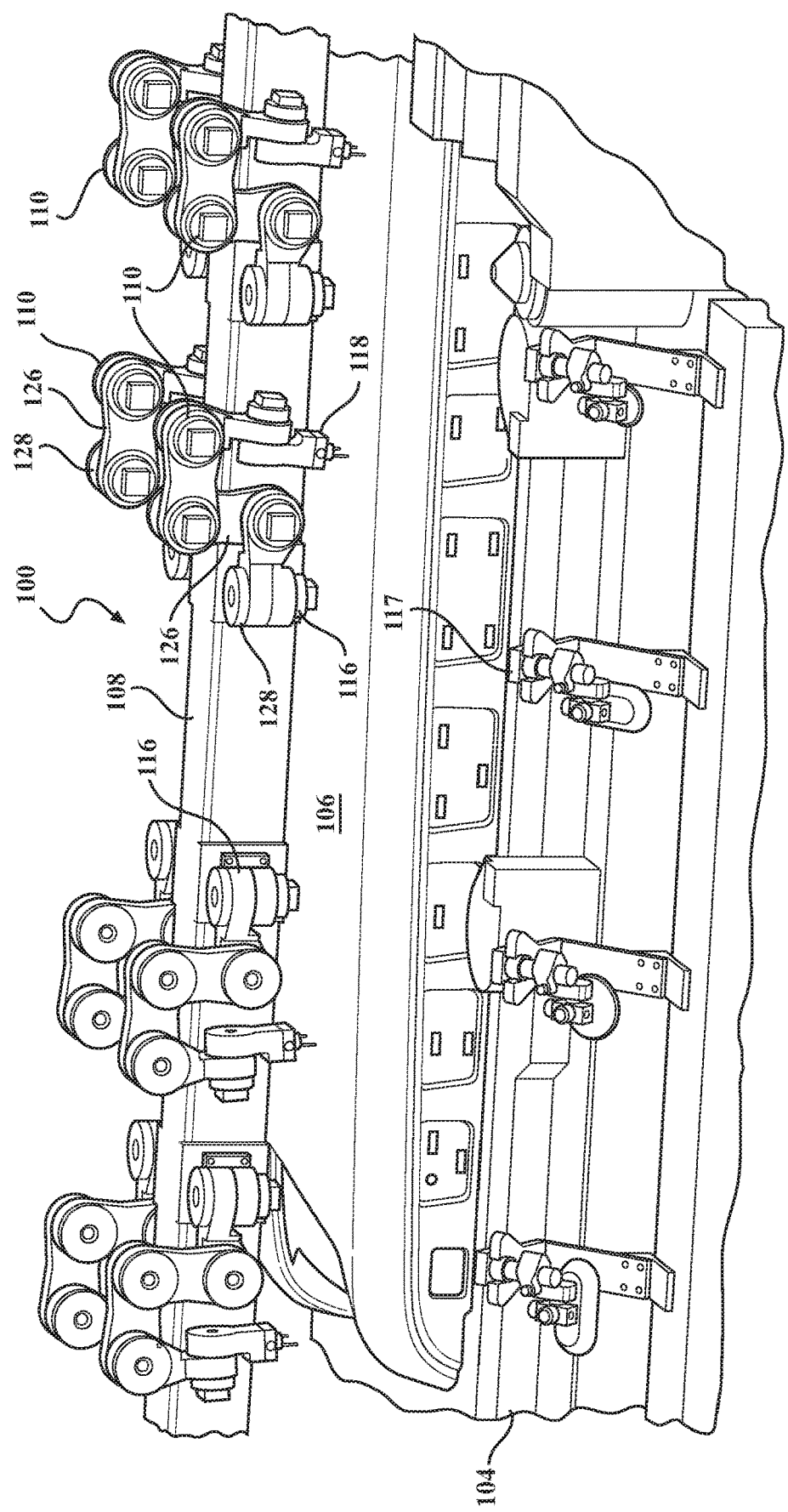
FIG. 8 a perspective view of an automated transforming tooling system of FIG. 6 utilizing an overhead transfer press rail with the transforming tooling assemblies disengaged from the end effector tools in the L-shaped brackets on the bottom press die.
Figure 9:
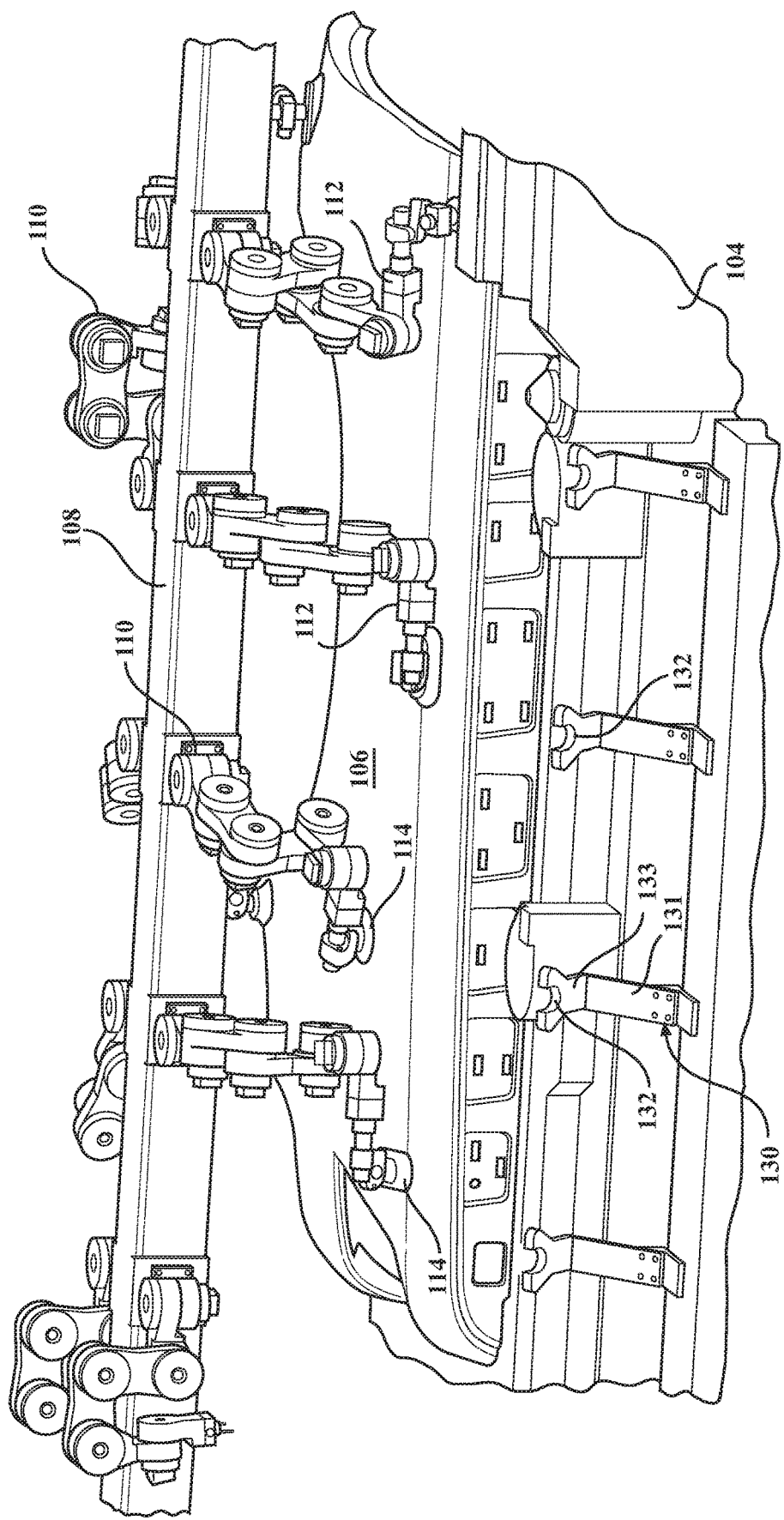
FIG. 9 is a perspective view of the automated transforming tooling system on an overhead transfer rail with the tooling assemblies and end effector tools engaged with the workpieces.
Figure 10:
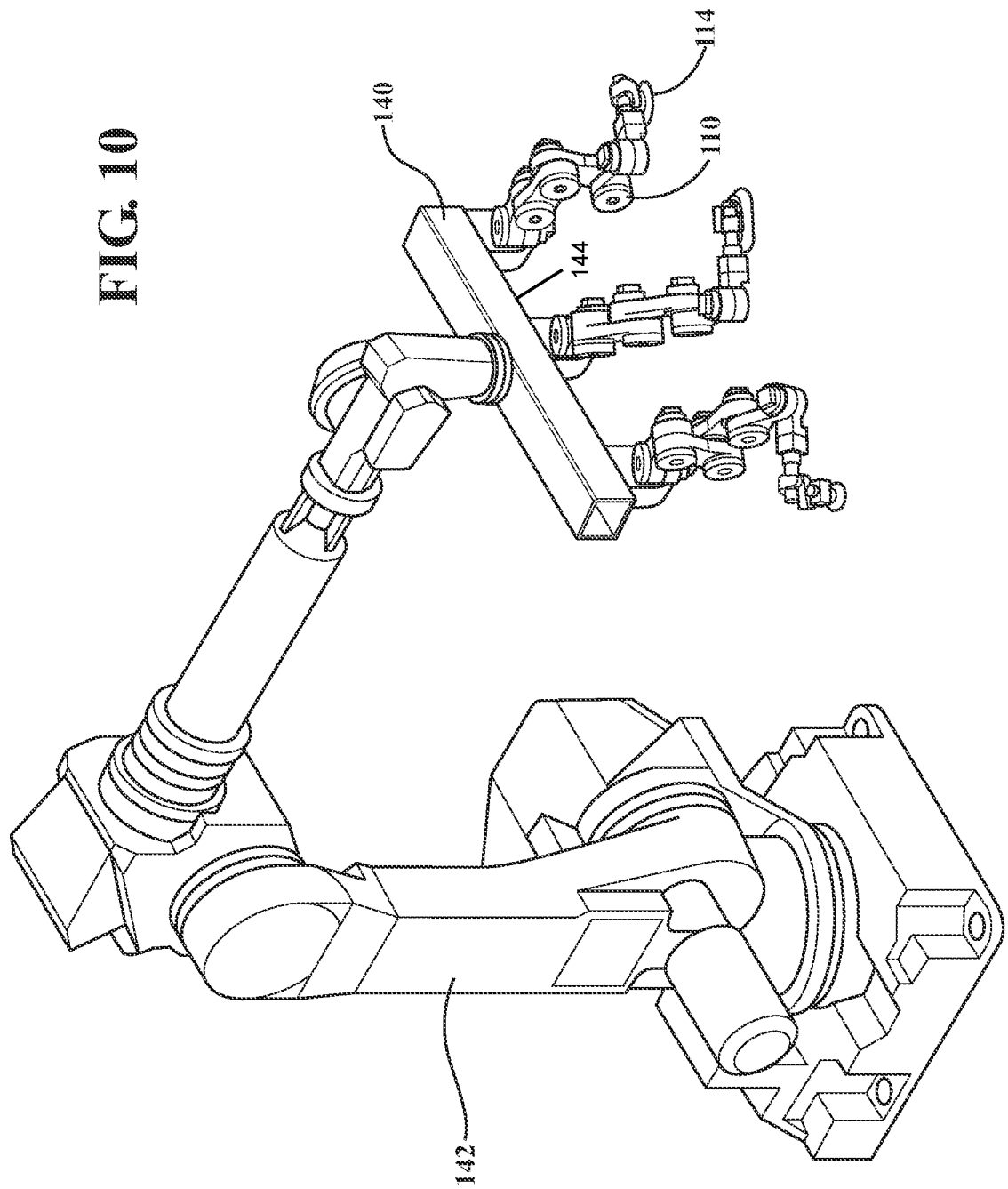
FIG. 10 is a perspective view of an automated transforming tooling system utilizing a transfer press rail connected to a robotic manipulator.

To shuttle the workpiece 106 between successive stamping press workstations 102, automated transforming tooling assemblies 110 are connected to the at least one transfer press rail 108. The position of the transfer press rail 108 may assume different configurations. For instance, in a nonlimiting disclosure, a tandem pair of the transfer press rails 108 may be substantially parallel and positioned on opposite sides of the bottom press die 104, as shown in FIGS. 1-5, a single transfer press rail 108 may be mounted overhead of the bottom press die 104, as shown in FIGS. 6-8, or a single transfer bar or transfer press rail 140 may be connected to a robotic manipulator 142 for three axis movement of the single transfer press rail 140 to and from the bottom press die 104, as shown in FIG. 10. In the configuration having the pair of transfer press rails 108, each of the automated transforming tooling assemblies 110 are mounted on interior, opposing sides of the adjacent pair of the transfer press rails 108. In the configuration have a single, overhead transfer press rail 108, the transfer press tooling assemblies 110 are mounted on opposite sides of the single overhead transfer press rail 108. In the configuration attached to the robotic manipulator 142, the automated transforming tooling assemblies 110 may be mounted to the bottom 144 of the transfer press rail 140. The automated transforming tooling assemblies 110 removably engage the workpiece 106, and the transfer press rails 108 cycle or move the automated transforming tooling assemblies 110, along with the workpiece 106, between adjacent stamping press workstations 102.

In order for the automated transforming tooling assemblies 110 to engage the workpiece 106 in a desired location on the workpiece 106, the automated transforming tooling assemblies 110 have a base 116 that is fixedly connected to a side 119 of the transfer press rail 108 or the bottom 144 of the transfer press rail 140. Electrical and pneumatic lines (not shown) may extend through and inside the transfer press rails 108, 140 and connect to electrical and pneumatic fittings (not shown) in the base 116 of the automated transforming tooling assemblies 110. Electric and pneumatic lines may extend through the automated transforming tooling assemblies 110 to the end effector tooling 114. The electrical and pneumatic lines are connected to a supply of electrical power and pressurized air to provide the automated transforming tooling assemblies 110 and the end effector tooling 114 with the appropriate electrical and pneumatic power. Access to the electrical and pneumatic lines may be provided through access plates 120 and boxes 122 located on the outer sides 124 of the transfer press rail 108.

To provide accurate positioning and strong support of the end effector tooling 114, the automated transforming tooling assembly 110 provides a plurality of links or arms 126 that are rotatably connected at their ends by joints 128, as similarly described and incorporated by reference therein to U.S. Pat. No. 10,124,486. The links 126 and the joints 128 start at the base 116 and extend outward from the transfer press rail 108, 140 where the automated transforming tooling assembly 110 is connected to the end effector tooling 114 for engaging the workpiece 106. Each joint 128 is automatically positioned by a motor (not shown) that is disposed within and associated with each joint 128. The motor provides rotational adjustment of the links 126 at the joints 128 to provide multi-axis positioning of the end effector tooling 114 at the end of the automated transforming tooling assembly 110. In a nonlimiting disclosure, the automated transforming tooling assembly 110 has five links 126 and five motorized joints 128, but the number of links 126 and joints 128 is not limiting. The motors may be controlled by a central processing unit (CPU), programmable controller, or a computer (not shown) to allow controlled positioning of the joints 128 and the links 126 thereby providing a predetermined position of the end effector tooling 114. Software may be utilized in conjunction with the CPU, programmable controller, or computer to provide predetermined coordinates or positioning of the links 126 and the joints 128 of the automated transforming tooling assembly 110 corresponding with the position of the end effector tooling 114 for each configured workpiece 106. Since the joints 128 may be kept in the same position for a number of operation cycles, the joints 128 each include a releasable clutch (not shown) that is disengaged to allow adjustment of the joints 128 by using their respective motors, and then engaged to prevent movement at the joints 128 in between adjustments to its position. The automated transfer press tooling assemblies 110 allow for automatic positioning of the joints 128 thereby allowing the end effector tooling 114 to be accurately positioned at a predetermined position and held rigidly over a large number of operation cycles so that the end effector tooling 114 is placed with a high degree of precision. This accurate positioning of the automated transfer press tooling assemblies 110 allows for use of the automatic tooling changing device 112, as will be described later, as well as the loading and unloading of the workpiece 106 to and from the bottom press die 104 of the stamping press workstations 102.

In order to change the end effector tooling 114 for various shapes and forms of workpieces 106, the automatic tool changing device 112 provides for the automatic changing of the end effector tooling 114 on the free end of the automated transforming tooling assembly 110. The automatic tool changing device 112 provides a quick-change tooling receiver 118 on the free end of the automated transforming tooling system tooling 110 opposite the base 116. The quick-change tooling receiver 118 releasably engages a quick-change tooling adapter 117 on the end effector tooling 114 to allow the desired end effector tooling 114 to be engaged with the automated transforming tooling assembly 110 for the proper workpiece 106. Since each different shaped workpiece 106 requires its own shaped stamping press dies, the bottom press die 104 is designed to hold and store the end effector tooling 114 required to engage the particular workpiece 106 associated with the stamping press die. Although the drawings of the present disclosure show the end effector tooling 114 being held and stored by the bottom press die 104, it should be noted that the top press die may also or alternatively hold and store one or more of the end effector tooling 114. Thus, when the stamping press dies are exchanged in the stamping press workstation 102 to produce a different shaped workpiece 106, the end effector tooling 114 necessary to engage and secure the workpiece 106 by the automated transforming tooling assembly 110 is secured to or stored in the bottom press die 104 and/or the top press die. This allows the automated transforming tooling system tooling 110 to engage the end effector tooling 114 upon the presentation of a new stamping press die in the stamping press workstation 102 of the stamping press.

The end effector tooling 114 may be stored in or secured to the bottom press die 104 using several different configurations. In a first embodiment of the automated tool changing device 112 as seen in FIGS. 1-4, a substantially L-shaped bracket 130 has a long side 131 of the L-shaped bracket 130 connected to an outer surface of the bottom press die 104 such that a short side 133 of the L-shaped bracket 130 extends outward away from the bottom press die 104. The short side 133 of the L-shaped bracket 130 has an open-ended slot 132 formed therein for receiving and holding a quick-change tooling adapter 117 connected to the end effector tooling 114. In a non-limiting disclosure, the short side 133 of the L-shaped bracket 130 defining the open-ended slot 132 may secure the quick-change tooling adapter 117 on the end effector tooling 114 in the open-ended slot 132 by providing a friction fit, a snap fit, or a spring bias fit between the L-shaped bracket 130 and the quick-change tooling adapter 117 on the end effector tooling 114. The end effector tooling 114 need only be raised and lowered into the open-ended slot 132 when unloading and loading the end effector tooling 114 into the L-shaped bracket 130 on the bottom press die 104.

When the end effector tooling 114 is secured and stored by the L-shaped bracket 130, the end effector tooling 114 is exposed outside of the bottom press die 104. A pair of closed ended slots 134 are formed in the short side 133 of the L-shaped bracket 130 and are positioned on each side of the open-ended slot 132, wherein the close ended slots 134 are open toward the transfer press rails 108, 140. The quick-change tooling receiver 118 mounted on the end of the automated transforming tooling assembly 110 has a pair of locating rods 136 that extend along the sides of the quick-change tooling receiver 118 to engage the close ended slots 134 in the L-shaped bracket 130. The closed ended slots 134 receive the locating rods 136 on the quick-change tooling receiver 118 to assist in positioning the quick-change tooling receiver 118 relative to the quick-change tooling adapter 117 on the end effector tooling 114 stored on the L-shaped bracket 130. The quick-change tooling adapter 117 and the quick-change tooling receiver 118 have a male/female coupling such that the quick-change tooling receiver 118 and the quick-change tooling adapter 117 can easily engage and disengage the end effector tooling 114 to and from the automated transforming tooling assembly 110. In a non-limiting disclosure, the quick-change tooling receiver 118 and the quick-change tooling adapter 117 may use any type of quick-change tooling means to engage and disengage the automated transforming tooling assembly 110 from the end effector tooling 114, such as spring actuated, ball actuated, rotationally actuated, friction fit, snap fit, etc. In addition, the quick-change tooling receiver 118 and quick-change tooling adapter 117 have electrical and pneumatic couplings that allow for electrical and pneumatic power to be transferred and supplied to the end effector tooling 114 from the automated press transfer tooling assembly 110.

In a second embodiment of the automated tool changing device 112 as further seen in FIGS. 1-4, the end effector tooling 114 is secured and stored inside a recess 138 provided in the bottom press die 104. The long side 131 of the L-shaped bracket 130 is connected to and disposed within the recess 138 of the bottom press die 104, and the short side 133 of the L-shaped bracket 130 is exposed just outside the bottom press die 104. The end effector tooling 114 is secured in the open-ended slot 132 in the short side 133 of the L-shaped bracket 130 as previously described such that the end effector tooling 114 is disposed within the recess 138 in the bottom press die 14 when not in use. The quick-change tool receiver 118 of the automated transforming tooling assembly 110 engages the quick-change tool adapter 117 on the end effector tooling 114 in the same manner as previously described in the first embodiment of the automated tool changing device 112. The recess 138 in the bottom press die 104 allows the end effector tooling 114 to be protected during transport and storage of the bottom press die 104; however, the condition and type of the end effector tooling 114 cannot be viewed by the operator without removing the end effector tooling 114 from the recess 138 provided in the bottom press die 104.

In a third embodiment of the automated tool changing device 112 wherein the transfer press rail 108 is mounted overhead of the bottom press die 104 as seen in FIGS. 6-9, the long side 131 of the L-shaped bracket 130 is connected to and mounted at an angle from an outer surface of the bottom press die 104. The L-shaped brackets 130 extend inward toward the transfer press rail 108 so that the transfer press tooling assembly 110 can access the end effector tooling 114 stored on the L-shaped brackets 130. The quick-change tool receiver 118 of the automated transforming tooling assembly 110 and the quick-change tool adapter 117 of the end effector tooling 114 operates in the same manner as previously described in the first and second embodiments of the automatic tool changing device 112.

As for the transfer press rail 140 being connected to a robotic manipulator 142 as shown in FIG. 10, the end effector tooling 114 may be mounted to, held to, or stored in the bottom press die 104 in any of the manners described in the three embodiments noted above. Thus, the quick-change tool adaptor 118 on the transfer press tooling assembly 110 of the transfer press rail 140 of the robotic manipulator 142 can access the quick-change tool adapter 117 of the end effector tooling 114 in the bottom press die 104 in any of the three embodiments noted above.

In operation, the automated transforming tooling system 100 may be utilized in conjunction with various types of manufacturing, assembling, and handling operations. In a nonlimiting disclosure, the workpiece 106 is loaded into the manufacturing, assembling, or handling operation, and the user inputs the particular model or configuration of the workpiece 106 into the CPU, programmable controller, or computer of the automated transforming tooling system 100. Other means may be utilized to communicate the model or configuration of the workpiece 106 to the automated transforming tooling system 100 as noted below. The CPU, programmable controller, or computer then sends a positioning signal to the automated transforming tooling assemblies 110. The joints 128 of the automated press transfer tooling assemblies 110 unlock, the motors in the joints 128 become actuated to synchronize the movement of the joints 128 and the links 126 to move and align the quick-change tooling receiver 118 at the free end of the automated transfer press tooling assemblies 110 with the quick-change tooling adapter 117 of the end effector tooling 114, and the joints 128 lock. The quick-change tooling receiver 118 engages the quick-change tooling adapter 117 on the end effector tooling 114, and the CPU, programmable controller, or computer then instructs the automated transforming tooling assemblies 110 to proceed in the same manner as noted above to the proper locations for allowing the end effector tooling 114 to engage the workpiece 106. The end effector tooling 114 engages the workpiece 106 at predetermined locations on the workpiece 106, and automated transforming tooling system 100 shuttles the workpiece 106 to the desired location. Once the workpiece 106 is properly placed into its destination, the end effector tooling 114 releases the workpiece 106, and the automated transforming tooling system 100 cycles back to the previous workstation 102 or position wherein the end effector tooling 114 engages the next workpiece 106. When it is time to produce a different model or differently shaped workpiece 106, the operator instructs the CPU, programmable controller, or computer of the automated transforming tooling system 100 that a workpiece 106 change is required, and the CPU, programmable controller, or computer instructs the automated transforming tooling assemblies 110 to place the end effector tooling 114 back onto the tool changer 112 wherein the cycle begins again.

As a further example of the method and apparatus in operation, the automated transforming tooling system 100 may be utilized in conjunction with a stamping press die loaded into a stamping press workstation 102 of a stamping press assembly in order to stamp a particular workpiece 106 as previously described. Regardless of the embodiment, each bottom press die 104 die has the necessary end effector tooling 114 mounted to the L-shaped brackets 130 to shuttle the respective workpiece 106 to the successive stamping press workstations 102. The user inputs the particular model of the workpiece 106 into the CPU, programmable controller, or computer of the automated transforming tooling system 100. Other non-limiting means may be used to communicate the model of the workpiece 106 to the CPU, programmable controller, or computer, such as having a microprocessor chip (not shown) or bar code (not shown) placed on the bottom press die 104 wherein a microprocessor reader or bar code scanner, respectfully, identifies the particular workpiece 106 and communicates the same to the CPU, programmable controller, or computer of the automated transforming tooling system 100. Once the CPU, programmable controller, or computer is aware of the model of the workpiece 106 and the bottom press die 104 that is loaded into the stamping press workstation 102 of the stamping press, the CPU, programmable controller, or computer sends a positioning signal to the automated transforming tooling assemblies 110. The joints 128 unlock, the motors in the joints 128 of the automated press transfer tooling assemblies 110 become actuated to synchronize the movement of the joints 128 and the links 126 to move and align the quick-change tooling receiver 118 at the free end of the automated transfer press tooling assemblies 110 with the quick-change tooling adapter 117 of the end effector tooling 114 mounted on the bottom press die 104, and the joints 128 then lock. The quick-change tooling receiver 118 engages the quick-change tooling adapter 117 on the end effector tooling 114, and the CPU, programmable controller, or computer then instructs the automated transforming tooling assemblies 110 to proceed to the proper locations for allowing the end effector tooling 114 to engage the workpiece 106. Movement of the automated transforming tooling assemblies 110 occur in the same manner as previously described. The end effector tooling 114 then engages the workpiece 106 at predetermined locations on the workpiece 106, and the transfer press rail(s) 108, 140 begin to cycle or move by rising upward away from the bottom press die 104 thereby raising the automated transforming tooling assemblies 110 on the transfer press rail(s) 108, 140 and lifting the workpiece 106 from the bottom press die 104. Once the workpiece 106 is clear from the bottom press die 104, the transfer press rail(s) 108, 140 indexes or moves horizontally to an adjacent stamping press workstation 102 where the next successive stamping operation will occur. The transfer press rail(s) 108, 140 positions the workpiece 106 over the bottom press die 104 of the adjacent stamping press workstation 102, and the transfer press rail(s) 108, 140 lowers the workpiece 106 into the bottom press die 104 of the adjacent stamping press workstation 102. Once the workpiece 106 is properly placed on the bottom press die 104, the end effector tooling 114 releases the workpiece 106, and the transfer press rail(s) 108, 140 cycles back to the previous stamping press workstation 102 wherein the end effector tooling 114 engages the next workpiece 106. When it is time to produce a different model or differently shaped workpiece 106, the operator instructs the CPU, programmable controller, or computer of the automated transforming tooling system 100 that a stamping press die change is required, and the CPU, programmable controller, or computer instructs the automated transfer press tooling assemblies 110 to place the end effector tooling 114 back onto the L-shaped brackets 130 of the bottom press die 104. Once the end effector tooling 114 is secured to the L-shaped brackets 130 of the bottom press die 104, the bottom press die 104 is removed from the stamping press workstation 102, and a different bottom press die 104 is loaded into the stamping press workstation 102 wherein the cycle begins again.

While the disclosure has been made in connection with what is presently considered to be the most practical and preferred embodiment, it should be understood that the disclosure is intended to cover various modifications and equivalent arrangements.

What is claimed is:

1. An automated transforming tooling system apparatus for shuttling a workpiece to and from an industrial operation, comprising:
   a workstation for complementarily engaging and securing the workpiece, and the workstation having at least one holder for removably securing at least one end effector tool to the workstation;
   at least one transfer bar positioned adjacent the workstation and movable with respect to the workstation;
   at least one automated transforming tooling assembly connected to the at least one transfer bar wherein the at least one automated transforming tooling assembly has a plurality of links adjustably connected by motorized joints to automatically position the automated transforming tooling assembly in a predetermined position; and
   an automated tool changer connected to a free end of each of the at least one automated transforming tooling assembly, and the automated tool changer releasably engaging the at least one end effector tool between a disengaged position, wherein the at least one end effector tool is disengaged from the automated tool changer and secured in the at least one holder of the workstation, and an engaged position, wherein the at least one end effector tool is engaged by the automated tool changer such that the at least one automated transforming tooling assembly moves toward the workpiece to allow the at least one end effector tool to engage the workpiece and move the workpiece to and from the workstation through the movement of the transfer bar.

2. The automated transforming tooling system apparatus as stated in claim 1, further comprising:
   a manipulator connected to the transfer bar for moving the transfer bar between predetermined positions.

3. The automated transforming tooling system apparatus as stated in claim 1, further comprising:
   a central processing unit in communication with the at least one transforming tooling assembly, and the central processing unit controlling the operation of the motorized joints to determine the position of the links.

4. The automated transforming tooling system apparatus as stated in claim 3, further comprising:
   the at least one transforming tooling assembly each having clutches to lock and unlock the motorized joints from moving prior to, during, and after the movement of the motorized joints.

5. The automated transforming tooling system apparatus as stated in claim 1, further comprising:
   an automated tool changing device for releasably connecting each of the at least one transforming tooling assembly to the end effector tool.

6. The automated transforming tooling system apparatus as stated in claim 5, further comprising:
   the automated tool changing device having a quick-change tooling receiver connected to each of the at least one transforming tooling assembly and a quick-change tooling adapter connected to the end effector tooling wherein the quick-change tooling receiver and the quick-change tooling adapter may releasably engage one another to releasably connect the end effector tooling to the at least one transforming tooling assembly.

7. The automated transforming tooling system apparatus as stated in claim 1, further comprising:
   the at least one holder on the workstation having a bracket with an open-ended slot for removably receiving and holding the end effector tooling.

8. The automated transforming tooling system apparatus as stated in claim 7, further comprising:
   a recess formed within the workstation wherein at least a portion of the bracket is disposed within the recess.

9. The automated transforming tooling system apparatus as stated in claim 2, the manipulator further comprising:
   a programmable robotic arm.

10. An automated transforming tooling system method for shuttling a workpiece to and from an industrial operation, the steps comprising:
    complementarily engaging and securing the workpiece to a workstation;
    securing at least one end effector tool in a holder connected to the workstation;
    movably positioning at least one transfer bar with respect the workstation;
    connecting at least one automated transforming tooling assembly to the at least one transfer bar wherein the at least one automated transforming tooling assembly has a plurality of links adjustably connected by motorized joints to automatically position the automated transforming tooling assembly in a predetermined position; and
    connecting an automated tool changer to a free end of each of the at least one automated transforming tooling assembly, and releasably engaging the automated tool changer to the at least one end effector tool between a disengaged position, wherein the at least one end effector tool is disengaged from the automated tool changer and secured in the at least one holder of the workstation, and an engaged position, wherein the at least one end effector tool is engaged by the automated tool changer such that the at least one automated transforming tooling assembly moves toward the workpiece to allow the at least one end effector tool to engage the workpiece and move the workpiece to and from the workstation through the movement of the transfer bar.

11. The automated transforming tooling method apparatus as stated in claim 10, further comprising the steps of:
connecting a manipulator to the transfer bar for moving the transfer bar between predetermined positions.

12. The automated transforming tooling system method as stated in claim 10, further comprising the steps of:
communicating signals from a central processing unit to the at least one transforming tooling assembly for controlling the operation of the motorized joints and determining the position of the links.

13. The automated transforming tooling system method as stated in claim 12, further comprising the steps of:
providing the at least one transforming tooling assembly with clutches to lock and unlock the motorized joints from moving prior to, during, and after the movement of the motorized joints.

14. The automated transforming tooling system method as stated in claim 10, further comprising the steps of:
releasably connecting an automated tool changing device to each of the at least one transforming tooling assembly and to the end effector tool.

15. The automated transforming tooling system method as stated in claim 10, further comprising the steps of:
the automated tool changing device having a quick-change tooling receiver connected to each of the at least one transforming tooling assembly and a quick-change tooling adapter connected to the end effector tooling wherein the quick-change tooling receiver and the quick-change tooling adapter may releasably engage one another to releasably connect the end effector tooling to the at least one transforming tooling assembly.

16. The automated transforming tooling system method as stated in claim 10, further comprising the steps of:
providing the at least one holder on the workstation with a bracket having an open-ended slot for removably receiving and holding the end effector tooling.

17. The automated transforming tooling system method as stated in claim 16, further comprising the steps of:
forming a recess within the workstation wherein at least a portion of the L shaped bracket is disposed within the recess.

18. The automated transforming tooling system method as stated in claim 11, further comprising the steps of:
providing a programmable robotic arm as the manipulator.

* * * * *